United States Patent [19]

Stranko et al.

[11] Patent Number: 4,458,312
[45] Date of Patent: Jul. 3, 1984

[54] RAPID INSTRUCTION REDIRECTION

[75] Inventors: Thomas A. Stranko; Robert L. Swann, both of Poughkeepsie, N.Y.

[73] Assignee: International Business Machines Corporation, Armonk, N.Y.

[21] Appl. No.: 319,870

[22] Filed: Nov. 10, 1981

[51] Int. Cl.³ .......................... G06F 3/00; G06F 13/00
[52] U.S. Cl. .................................................. 364/200
[58] Field of Search ... 364/900 MS File, 200 MS File, 364/660, 650, 593, 677, 412, 413, 385; 371/23, 48

[56] References Cited

U.S. PATENT DOCUMENTS

| | | | |
|---|---|---|---|
| 3,553,654 | 1/1971 | Crane | 364/200 |
| 3,668,651 | 6/1972 | Hornung | 364/200 |
| 3,675,214 | 7/1972 | Ellis et al. | 364/200 |
| 3,710,324 | 1/1973 | Cohen et al. | 364/200 |
| 3,814,919 | 6/1974 | Repton et al. | 364/200 |
| 3,909,782 | 9/1975 | Mazier | 364/200 |
| 4,003,028 | 1/1977 | Bennett et al. | 364/200 |
| 4,004,283 | 1/1977 | Bennett et al. | 364/200 |
| 4,023,143 | 5/1977 | Braunstein | 364/200 |
| 4,313,162 | 1/1982 | Baun et al. | 364/200 |
| 4,326,249 | 4/1982 | Godsey | 364/200 |
| 4,332,011 | 5/1982 | Epstein et al. | 364/200 |
| 4,393,470 | 7/1983 | Miard | 364/200 |
| 4,400,778 | 8/1983 | Vivian et al. | 364/200 |

*Primary Examiner*—Jerry Smith
*Assistant Examiner*—Jameson Lee
*Attorney, Agent, or Firm*—James E. Murray

[57] ABSTRACT

A mechanism is provided for saving substantial time when a service processor needs to communicate with one of a plurality of satellite devices, but does not know the identity of the specific device. The service processor, through an intermediate adapter, issues a command which addresses the class of devices. The adapter redirects the command to the specific device, and concatenates the response from that device along with the device's identity and forwards this to the service processor. Further communication between the service processor and the specific device can then take place directly.

4 Claims, 2 Drawing Figures

RAPID INSTRUCTION REDIRECTION

BACKGROUND OF THE INVENTION

This invention relates to communication between a processor and various satellite processors. More particularly, it relates to communication between a service processor and a satellite programmable devices which monitor various aspects of a data processing system.

In today's increasingly complex electronic data processing systems, more and more use is being made of simple programmable devices scattered throughout the system to monitor various aspects of the system and its environment. These satellite devices form part of the means through which a portion of the system, typically a service processor, can keep track of system parameters and, to some extent, modify them.

Among the parameters monitored by these satellite devices are several (e.g., temperature, voltage, current) which, if they exceed certain boundary conditions, can severely damage the system. When such conditions are identified, immediate corrective action is absolutely essential.

One impediment to immediate action is the fact that the conditions are normally arranged in groups for presentation to the service processor. For example, an over-temperature condition in one portion of a data processing system will typically result in a signal to the service processor which tells it only that one problem within a certain class of problems has arisen. In the typical prior art system, the service processor would then need to interrogate various units to determine the precise problem. In some situations, this interrogation could take enough time for substantial system damage to occur. For this reason, it is quite common in data processing systems for certain problems, such as over-temperature conditions, to be resolved by immediately shutting down a portion or all of the system.

Another approach to a solution of this problem is to increase the capability of the satellite units which monitor the system. If these units are made powerful enough to deal with the problem entirely on their own, rather than have to communicate with a service processor, then the problems involved in the time required for such communication will be obviated. However, this type of solution will increase the cost and completely of the data processing system.

BRIEF DESCRIPTION OF THE INVENTION

The above and other problems of the prior art are overcome in accordance with one preferred embodiment of this invention by providing a mechanism which greatly reduces the amount of time required for a service processor to identify system problems by communicating with a satellite monitoring device. In the preferred embodiment, the existence of a class of problems (for example, a logic problem or a power/thermal problem) is signalled to the service processor by a particular type of interrupt. The service processor responds to the interrupt with a command which addresses all of the units which could have been the source of the interrupt. The command from the service processor passes through an adapter which redirects it to the specific unit which initiated the interrupt. The response from that unit goes back to the adapter where the response is concatenated with the identity of the specific unit. This information is transmitted to the service processor which can then communicate directly with the unit which detected the anomalous situation.

The primary advantage of this invention is that it enables a service processor to communicate with a monitoring unit which has detected an anomalous situation without the use of time-consuming polling or software looping.

This rapid response time may prevent significant damage to a system or may prevent the alternative of shutting a system down in order to prevent such damage.

BRIEF DESCRIPTION OF THE DRAWINGS

In the following drawings, which form a material part of this specification.

DETAILED DESCRIPTION

Descriptions relating to an environmental system in which this invention may be implemented are found in the following manuals, all available from International Business Machines Corporation. The manuals are part of the IBM Maintenance Library, 3081 Processor Complex. Individual titles are:

Processor Unit Introduction/Maintenance (PRM) (Form No. SY22-7061);

Central Storage and External Data Controller Introduction/Maintenance (CSM) (EDC) (Form No. SY22-7062);

3082 Processor Controller Maintenance (PCM) (Form No. SY22-7063);

3082 Processor Controller Theory/Diagrams (PCT) (Form No. SY22-7064);

3082 Processor Controller User's Guide (UGD) (Form No. SY22-7065);

Power Operation and Maintenance (PWR) (Form No. SY22-7066);

3087 Coolant Distrubution Unit Cooland Distribution and Maintenance (CDU) (Form No. SY22-7067);

3089 Power Unit Installation/Maintenance (PGM) (Serial Numbers Below 41000) (Form No. SY22-7069);

Return Codes and Messages (RCM) (Form No. SY22-7070);

Maintenance Guide (Form No. SY22-7071);

3089 Power Unit Installation/Maintenance (PGM) (Serial Numbers 41000 and Above) (Form No. SY22-7072).

The environmental system, as described in the abovereferenced manuals, includes five logic support stations (LSS's) that are integrated within the central processor. These LSS's are related to central processor logic and provide information regarding the possible presence of logical errors or failures.

Also provided within the environmental system are four device support stations (DSS's) which provide information about, and some control over, the environment of the processing system. For example, the DSS's monitor temperature, voltage, current, coolant flow and other critical environmental parameters. In particular, the DSS's monitor parameters which, if they were to fall outside of certain predetermined ranges, could cause substantial physical damage to the data processing system.

Figure 1:
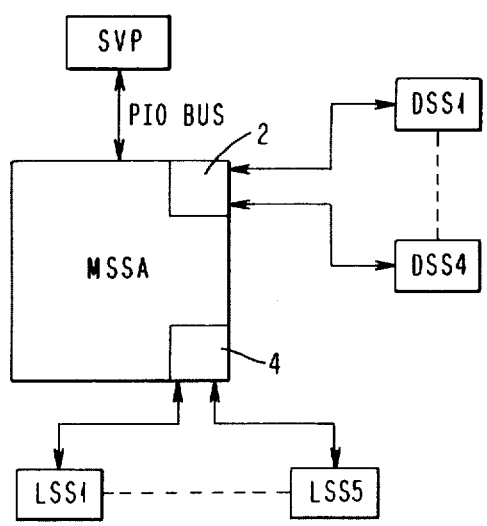
FIG. 1 is a block diagram showing an overview of a system including this invention.

FIG. 1 illustrates certain of the above aspects of the data processing system. It shows the four DSS's (DSS1 through DSS4), the five LSS's (LSS1 through LSS5), the service processor (SVP), and a maintenance service support adapter (MSSA) through which the SVP communicates with DSS's, LSS's and various other portions of the system. Communication between the SVP and MSSA is normally via a programmed I/O bus (PIO BUS) which transfers information between the SVP and a staging register within the MSSA. As will be discussed further below, the MSSA can request immediate attention from the SVP via interrupt lines (not shown in FIG. 1) which connect the two units.

When an anomalous situation is detected by a DSS, it sends an interrupt signal to an area 2 within the MSSA. The signals from all of the DSS's are, in effect, OR'ed together and a single interrupt is presented from the MSSA to the SVP indicating that a DSS has detected a problem.

Similarly, if an LSS detects a problem, it transmits an interrupt to an area 4 within the MSSA which is then transmitted as a single interrupt from the MSSA to the SVP as an indication that there is a LSS problem.

The SVP must then, as quickly as possible, determine the location of the problem (by finding out which DSS or LSS detected the problem) and it must find out the nature of the problem by communicating with the appropriate DSS or LSS.

In the following discussion, we will assume that the problem to be dealt with has been discovered by a DSS. All of the following discussion which relates to the DSS's is identically applicable to a problem that could have been discovered by an LSS.

Figure 2:
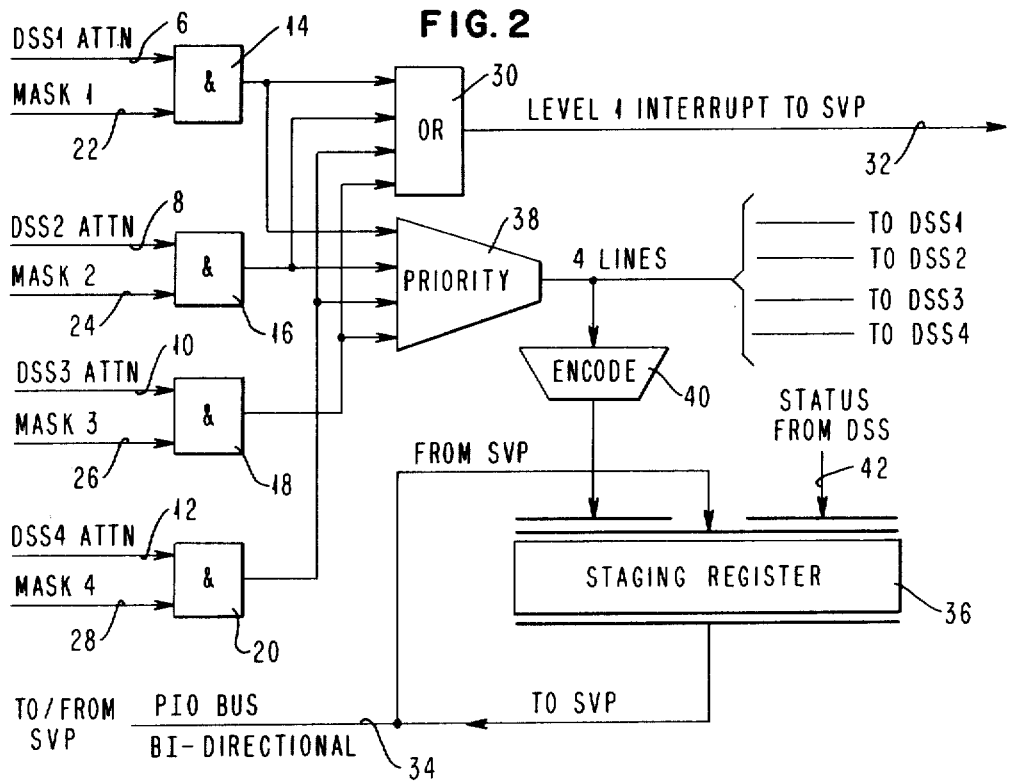
FIG. 2 shows additional details of certain novel aspects of the invention.

Referring now to FIG. 2, the inventive portions of the MSSA (area 2 shown in FIG. 1) are illustrated in more detail.

Each of DSS1 through DSS4 has its individual attention line 6, 8, 10 and 12, respectively which feed respective AND circuits 14, 16, 18 and 20. Also feeding the AND circuits are mask lines 22, 24, 26 and 28, respectively, which can be used to mask out signals from any of the DSS's. Throughout the following discussion, it will be assumed that none of the DSS attention lines are masked.

If any of the DSS's detects an anomalous situation and raises its attention line, OR circuit 30 will pass a "level 1" interrupt to the SVP on line 32. Because of the dangers inherent in the types of situations detected by DSS's, the level 1 interrupt has very high priority. (The only interrupt with higher priority is a level 0 interrupt indicating a problem within the MSSA itself.) Problems detected by LSS's, which generally are not as critical as those detected by DSS's, present level 2 interrupts to the SVP.

The SVP responds to the level 1 interrupt by sending a SENSE DSS command to the MSSA on the PIO BUS. The command is written into the staging register 36 within the MSSA. The MSSA responds to the SENSE DSS command by first confirming that a DSS attention line has been raised. (Receipt of the SENSE DSS command necessarily implies that a level 1 interrupt was transmitted to the SVP so, the absence of a DSS attention line would be indicative of a problem within the MSSA or perhaps within the SVP.) If only one DSS attention line is up, the MSSA will simply redirect the SENSE DSS command to the appropriate DSS. If more than one DSS attention line is up, then priority circuit 38 will select the specific DSS to receive the SENSE command.

In either event, the identity of the DSS to which the SENSE command was redirected will be encoded in encoder 40 and placed into the staging register 36. The response on line 42 from the DSS that receives the SENSE command is also placed in the staging register.

The MSSA will then, (at completion of the SENSE DSS command) pass the contents of the staging register 36, via the PIO BUS, to the SVP providing the status of the appropriate DSS and its identification. Further communication between the SVP and DSS will then be accomplished by the SVP directly addressing the appropriate DSS. (Although the communication is through the MSSA, the path is essentially direct, with no extra delay introduced by the MSSA.)

If it had been an LSS which provided the initial attention signal, exactly the same kind of procedure would have been utilized with substantially exactly the same kind of circuitry. In the environmental system, the only difference between the LSS circuitry and the DSS circuitry is that, because there are five LSS's, there would be five LSS attention lines, five LSS mask lines, and five associated AND circuits. Also, an LSS attention line would, as mentioned above, result in the transmission of a level 2 interrupt to the SVP. If the SVP were to receive level 1 and level 2 interrupts at the same time, the level 1 interrupt would be serviced first.

Those who may wish to have additional details regarding such things as instruction formats and the manner in which the SVP communicates with LSS's and DSS's through the MSSA may refer to the manuals incorporated by reference above. Those specific details need not be, and are not, included herein because they would be of little value to someone who wished to incorporate this invention in a data processing system other than the specific environmental system described in those manuals. Specific implementations of those particular features of such a system would of course depend upon the architecture and technology used in a system in which this invention is incorporated. For any such system, those skilled in the art will obtain all of the information they need from the description and the drawings contained herein.

While the invention has been shown and described with reference to a preferred embodiment thereof, it will be understood by those skilled in the art that various changes in form and detail may be made therein without departing from the spirit and scope of the invention.

Having thus described our invention, what we claim as new, and desire to secure by Letters Patent is:

1. In a data processing system in which a processor communicates with a plurality of satellite monitoring devices through a single intermediate adapter, a mechanism within the intermediate adapter for simultaneously transmitting status information with information identifying to the processor a particular satellite monitoring device in the plurality of satellite monitoring devices which has detected an anomaly during its monitoring operations comprising:

means for receiving a first interrupt signal from said particular satellite monitoring device to said adapter on the occuring of said anomally;

means for responding to the receipt of said first interrupt signal by said adapter by transmitting a second interrupt signal to said processor, said second interrupt signal indicating that said first interrupt signal was of a particular class;

means for receiving from said processor an acknowledgment to said second interrupt which initiates a request for additional information regarding said particular satellite monitoring device which detected the anomaly;

means responsive to said acknowledgment for transmitting said request to said particular satellite monitoring device;

means for receiving said additional information from said particular satellite monitoring device subsequent to the transmission of said request to said particular satellite monitoring device; and means for providing a single response from said adapter to said processor subsequent to the receipt of said additional information from said particular satellite monitoring device which both identifies said particular satellite device and includes said additional information.

2. The apparatus of claim 1, wherein:

there are at least two different categories of satellite monitoring devices, where satellite monitoring devices of each category monitor a different class of conditions; and interrupts from each of the satellite monitoring devices are presented to the intermediate adapter in a manner which identifies the category of the satellite monitoring device which originated the interrupt.

3. The mechanism in the intermediate adapter of claim 1 including:

input means for receiving an interrupt signal from each one of plurality of satellite devices each on a different line;

priority means for selecting between simultaneously occurring interrupt signals from said plurality of satellite devices and providing an output signal indicative of said particular satellite device providing the selected interryst signal;

means responsive to the output signal from the priority means and to the request for additional information to provide said request for additional information to said particular satellite device.

4. The mechanism in the intermediate adapter of claim 3 including:

encode means responsive to said output of the priority means to provide a signal identifying said particular satellite device to said processor;

register means for receiving both said signal identifying said particular satellite device from said encode means and said additional information provided by said particular satellite device.

* * * * *